Jan. 21, 1936.  W. J. ZENNER  2,028,641

MOTOR CONTROL

Filed Nov. 1, 1934

INVENTOR
WALTER J. ZENNER
BY
ATTORNEY

Patented Jan. 21, 1936

2,028,641

UNITED STATES PATENT OFFICE 2,028,641

MOTOR CONTROL

Walter J. Zenner, Des Plaines, Ill., assignor to Teletype Corporation, Chicago, Ill., a corporation of Delaware Application November 1, 1934, Serial No. 750,913

12 Claims. (Cl. 178—4.1)

This invention pertains to telegraphy and more particularly to printing telegraph systems wherein the printing telegraph apparatus is driven by a motor which is individual to each unit and which is operated only while the telegraph apparatus is being used.

Where a motor driven telegraph unit is operating only at intervals during the day, an economy in power consumption and in maintenance resulting from wear may be effected by a system of motor control which will cause the motor to remain inert when not required for service and which will cause the motor to operate while service is required.

Systems for the accomplishment of such a result have been designed with various mechanisms and with various requirements upon the line signal circuit for control of the mechanism for starting and stopping motors. It appears desirable that mere opening of a line, thus rendering the main signal circuit without current, should stop the motors promptly, since with that condition of line no transmission of intelligence can occur. Likewise, it appears desirable that presence of any current in the main signaling circuit regardless of its polarity or character following such a condition should start the motors into operation.

An object of this invention therefore is to provide a motor control system in which a motor will be stopped in response to an open line condition or condition of no-current in the signaling circuit, and in which the motors will start when a signaling condition of current of any nature or character in the signaling circuit is restored.

A further object is to provide for stopping all motors by transmission over the signaling line of a code of impulses, whereby motors may be rendered non-operating even though a signaling condition of current be present in the line immediately thereafter and indefinitely thereafter, with provision for restarting motors by a minimum cycle of line signaling operations.

Further features of the invention are to provide a system embodying an electric switch for opening a power circuit to stop an electric motor in which system the motor supplies mechanical power to operate the switch to open the power circuit, and to provide a system for controlling a motor of a telegraph unit by a selective action in the selector thereof similar to a selective action as normally performed for selecting and printing operations.

The above and other objects of the invention are attained by adding to the selector of a telegraph printer such parts as are required for accomplishment of the purposes of motor control, and thereafter utilizing fully the selector of the printer for motor control purposes without detracting from its use for selecting and printing purposes.

The system of this invention, when applied to a receiving printer of type bar structure, causes the selector of the printer to function and operate a motor supply control switch in the same manner that the selector functions and operates a type bar to print, the operated motor supply switch then opening the motor power supply circuit and remaining in its operated condition until controlled by a line signal to return to its normal condition to reclose the motor supply circuit.

In the matter of provision of motor control apparatus in a receiving printer having pull bars by which type bars are operated, a special pull bar is provided for motor control purposes. The selector of the receiving printer is arranged to operate the special pull bar in response to a code of received signal impulses similar to a code of impulses for operating any pull bar for printing purposes, and an operating mechanical element of an electrical switch for motor control purposes is linked directly to the special pull bar. The motor control switch is arranged with a latch and with a magnet for releasing the latch, the circuit of the magnet being arranged to be controlled from signals in the main transmission line of the telegraphic system, or from a relay in the main transmission line. Preferably, a code for operating the special motor control pull bar is such that the special pull bar is operated and the motor is stopped in response to a cessation of signaling current in the line circuit and the latch to release the switch to effect the starting of the motor may be operated by the presence of any current in the line circuit.

A better understanding of the invention may be had from the following description, taken in conjunction with the accompanying drawing wherein Fig. 1 shows a structure according to this invention;

Figure 1:
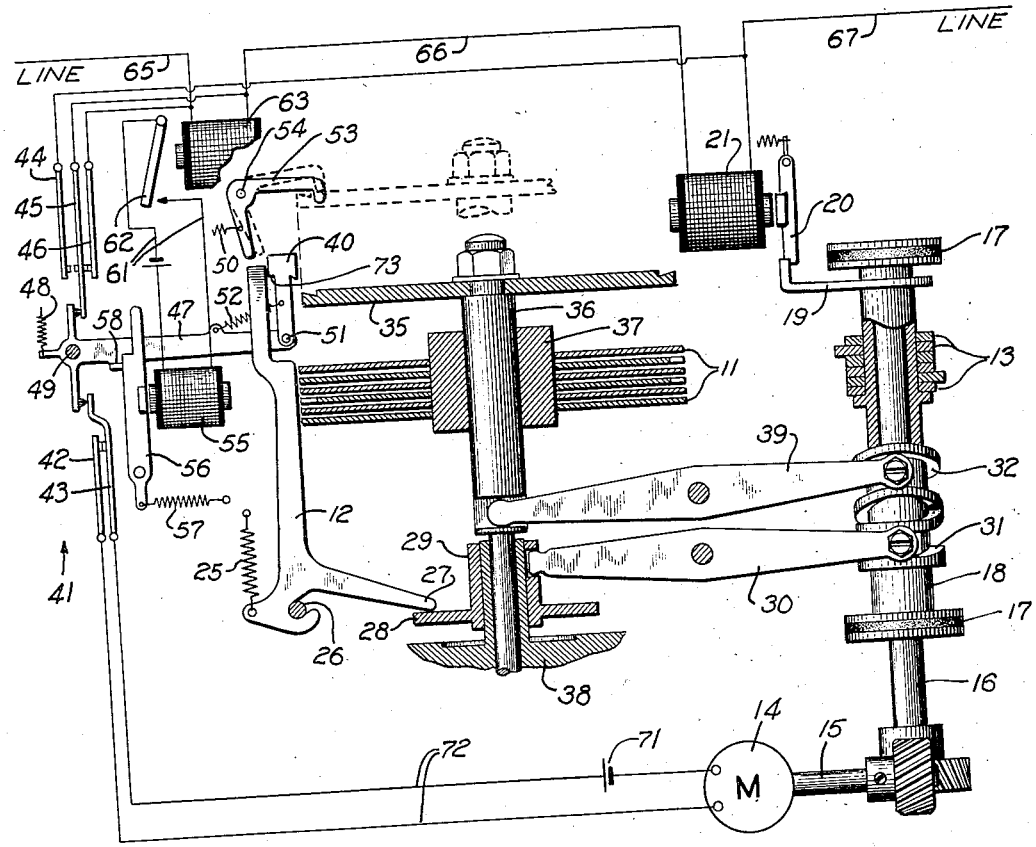

In Fig. 1, a mechanical telegraph selector is indicated by code discs 11 cooperating with a plurality of detector bars or drop bars 12, discs 11 being adjustable by cams 13 through intermediate apparatus not shown, but which may be of the type disclosed in Patent No. 1,989,710, granted Feb. 5, 1935 to A. H. Reiber et al. A motor 14 drives continuously shafts 15 and 16 and through friction clutch 17 tends to drive a start-stop cam sleeve 18 which normally is prevented from rotating because of the engagement of stop arm 19 with the armature 20 of a line signal magnet 21. Each bar 12 at all times is under tension of an individual spring 25 which tends to rotate it upon its axis 26 towards discs 11, but it may be engaged at its end 27 by flange 28 on sliding sleeve 29 which is operated by the pivoted cam follower 30 under control of cam 31 on cam sleeve 18. When a detector bar such as 12 is permitted by flange 28 to rotate and drop into aligned code notches in discs 11, it pushes a type-operating bar into position for engagement by a circular power bail 35 which is carried by a reciprocating rod 36 sliding in frame parts 37 and 38 and driven by pivoted cam follower 39 controlled by cam 32 on cam sleeve 18.

To the selector as above described there have been added, for purposes of this invention, an additional detector bar 12 with spring 25 as shown, an additional pull bar 40 of special design as shown, an electrical switch indicated generally by the label 41 comprising contacts 42 to 46 inclusive, and a switch operating arm 47 with spring 48 pivoted to the frame of the selector at 49. Special pull bar 40 is pivoted upon switch arm 47 at 51 and is under tension of spring 52 connected to switch arm 47 which tends to draw pull bar 40 against bar 12 or against bell crank 53 which is pivoted to the frame at 54 and which may rotate against pull of its spring 50 when struck by bail 35. Magnet 55 has a notched and pivoted armature 56 with spring 57 which draws armature 56 against lug 58 on the switch operating arm 47 in such manner that when switch arm 47 is lifted, its lug 58 will be engaged and supported by the notch of armature 56 so that switch arm 47 can not return to its position shown until after it has been released by the operation of armature 56. Magnet 55 is in a circuit formed by wires 61 and controlled by contact and armature 62 of relay 63 which is connected in a line circuit formed by line wires 65, 66, and 67, and is shunted by contacts 45 and 46 which are closed during the running condition of the motor of the telegraph unit. Relay 21 also is included in the same line circuit and, like relay 63, is at times shunted by contacts 44 and 45 which are open during the running condition of the motor of the telegraph unit. Motor 14 and its source of power 71 are included in a circuit formed by wires 72 and controlled by contacts 42 and 43 which are closed to render the telegraph unit in operating condition.

A description of operation of the invention as disclosed in Fig. 1 is as follows: The unit is in operating condition as shown in the drawing, and motor 14 may be controlled to stop by opening the line circuit. Code discs 11 are cut to permit operation of detector bar 12 when discs 11 are set in accordance with six signal intervals of spacing signaling electrical condition received from the line circuit, which premise is fulfilled by "blank" signal code and also when the line is opened for an indefinite period. Detector bar 12, when such selecting condition has been established, rotates clockwise and pushes pull bar 40 into position where it is engaged and lifted by circular power bail 35, thereby lifting pivot 51 and rotating switch operating arm 47 counterclockwise, whereupon contact spring 45 is shifted from contact 46 into engagement with contact 44, contact spring 43 is moved out of engagement with contact 42, and spring 57 rotates armature 56 to place its shoulder under lug 58. Power for motor 14 in circuit 72 has been interrupted by the opening of contacts 42 and 43, but motor 14 may make many revolutions due to its momentum, thereby operating the shaft 16 and cam sleeve 18 for several revolutions, because cam sleeve 18 is no longer restrained by armature 20 which is now in its retracted position since lines 66 and 67 are without signaling current, and further, magnet 21 is shunted by contacts 44 and 45, now closed, while relay 63 is included in the line circuit by virtue of the opening of contacts 45 and 46. Power bail 35, therefore, may stop in any position, and motor 14 will remain inert as long as lines 66 and 67 remain without current sufficient to energize relay 63 to operate its armature. Pull bar 40 remains in an elevated position, retained in such position by engagement of armature 56 and lug 58 which retain switch operating arm 47 in counterclockwise position. Pull bar 40 is held against bell crank 53 by tension of spring 52.

To restore the equipment shown in the drawing to operating condition, signaling current may be placed upon line 66, to energize relay 63, which in turn will energize magnet 55 to withdraw armature 56 from lug 58, thus releasing arm 47 which will rotate clockwise by tension of spring 48, thus closing contacts 42 and 43 to supply power to motor 14; also shifting contact spring 45 from contact 44 into engagement with contact 46, thereby shunting relay 63 from line 66 and including magnet 21 in line 66. Current in line 66 will energize magnet 21 to draw its armature 20 into position for engagement with stop arm 19, and motor 14 will rotate cam sleeve 18 until the cam sleeve is stopped by engagement of stop arm 19 with armature 20, which will condition the equipment for code signal reception.

Figures 2, 3:
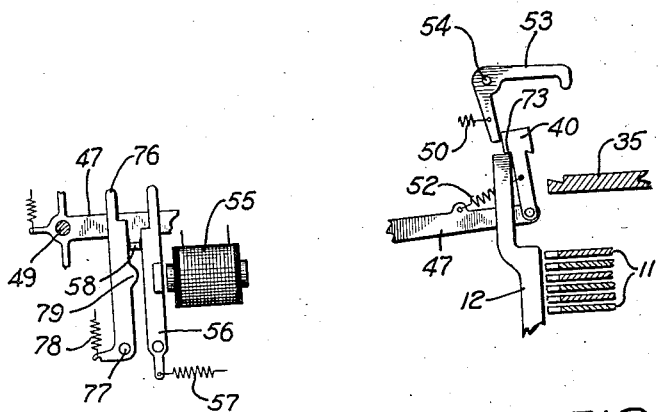
Fig. 2 shows a detail of apparatus of Fig. 1.
Fig. 3 shows a modification of apparatus of Fig. 1.

At the time that switch arm 47 descends in response to the energization of relay 63 and magnet 55, pull bar 40 will descend until its shoulder 73 engages the upper extremity of bar 12, as shown in Fig. 2. The reason for providing the pull bar 40 with the shoulder 73 is to permit the bar to remain rotated slightly counterclockwise, by virtue of spring 52, from its normal or unoperated position, which is the position shown in Fig. 1, so that as it descends no part of it can be in operative alignment with power bail 35. It has previously been stated that power bail 35 may stop in any position and it follows from this that flange 28, which is operated from cam sleeve 18, as is power bail 35, may stop in any position, and if the position should happen to be the lowermost, the detector bar 12 would be in its selected position, entering aligned notches in the code discs 11. In such selected position the detector bar 12 would urge the pull bar 40 into the path of the power bail 35 which would operate as the motor started, lift the pull bar and thus open the motor circuit. The shoulder 73 and the narrower portion of the pull bar 40 below the shoulder permit the bar to descend, out of alignment with the power bail and to a position slightly above its normal unoperated position. When, subsequently, bail 35 engages and rotates bell crank 53 to counterclockwise position, pull bar 40 will be pushed off of bar 12 and will assume its normal position, shown in Fig. 1. It is to be understood that the relationship between operative rotation of switch lever 47 and the opening and closing of contacts 42 and 43 is such that these contacts close before the pull bar 40, in its descent, reaches the position shown in Fig. 2. The contact arms may be made of spring material and the arm 42 may be self-biased for slight clockwise movement toward arm 43 so that contact 42 may follow contact 43 a short distance as the latter is moved clockwise by the switch arm 47. This provides the proper time relationship between the operation of switch operating arm 47 and the opening and closing of contacts 42 and 43 and also affords desirable wiping action between the contacts.

In Fig. 3 is shown a modification whereby a code of impulses received over the signaling line will render the motor inert after which the structure illustrated will preserve the motor inert during a period of continuance of stop-signal line condition of current and during a subsequent period of no line current, and then will render the motor effective in response to a resumption of signaling current in the line circuit.

There are shown in Fig. 3 switch arm 47, pivot 49, magnet 55, armature 56, and lug 58. There is added a latch 76, pivoted at 77, tensioned by spring 78, and having a point of mechanical contact 79 adapted to engage armature 56. When springs 57 and 78 are opposed through contact 79, spring 57 overpowers spring 78.

In operation, a predetermined code, as "blank code," is received over line circuit 66. Code discs 11 are cut to permit operation of detector bar 12 when discs 11 are set in response to the said code, and when power bail 35 then lifts arm 47 the following operations occur: Contacts 42, 43 open to stop motor 14. Contacts 45, 46 open to include relay 63 in line circuit 66 in which circuit a signal current is flowing which energizes relay 63 which in turn energizes magnet 55, thus attracting armature 56. Contacts 44, 45 close and shunt magnet 21, excluding it from line circuit 66. Bail 35 lowers and releases pull bar 40 and arm 47. Lug 58 engages shoulder of latch 76 which has moved under tension of spring 78 to engage armature 56 at contact point 79. Thus there is attained a stable condition which continues so long as current continues in line circuit 66, maintaining relay 63 and magnet 55 energized.

To restore the equipment of Fig. 3 to operating condition, signaling current is removed from line 66 and then restored. Removal of signal current from line 66 deenergizes relay 63 which in turn deenergizes magnet 55. Spring 57 overcomes spring 78 and moves armature 56 to push latch 76 to remove its shoulder from lug 58 which then engages the slightly lower shoulder of armature 56, producing a movement of arm 47 not sufficient to change any contacts in switch 41. Restoration of current in line 66 and consequent energization of magnet 55 and attraction of armature 56 will operate as described above in description of Fig. 1. The stepped relation between the shoulders on armature 56 and latch 76 provides a double trip-off latch to control the starting of the motor in response to opening and then closing of the signal line circuit. Thus, according to the embodiment of the invention disclosed in Fig. 3, it is noted that in the event that the line circuit is either inadvertently opened or is purposely opened after the day's run, the motor will not be started because as indicated above the lug 58 will engage the shoulder on armature 56, thus preventing this occurrence. The motor, therefore, will remain inert until the line circuit is again closed.

Although the invention has been described in connection with a specific form thereof, it will be understood that it has further applications and it is not intended to be limited in scope by the embodiment shown herein for illustration.

The invention claimed is:

1. In a motor control system, a mechanical selector, a selectable mechanical member operable thereby, a magnet, an electric switch operable in one manner under control of said mechanical member and subsequently operable in reverse manner under control of said magnet, a line circuit, a line signaling magnet for said mechanical selector normally included in said line circuit, contacts in said electric switch for including in said line circuit alternatively either said line signaling magnet or said first mentioned magnet, a motor for said selector, and a power circuit for said motor controlled by said electrical switch.

2. In a motor control system, a mechanical selector, a telegraphically controlled magnet adapted to control said selector, a selectable mechanical member operable by said selector, an electrical switch directly operable by said mechanical member, a further telegraphically controlled magnet rendered responsive to signals when said switch is in operated condition and operating when controlled telegraphically to restore said mechanical member, a motor for driving said selector, and a power circuit for said motor controlled by said electrical switch.

3. In a motor control system, a mechanical selector, an electrical switch, a first signal receiving magnet to control said selector, wholly mechanical means operable by said selector in response to said first signal receiving magnet to control said electrical switch, a second signal receiving magnet to control said electrical switch, a line circuit, contacts in said electrical switch adapted to include in said line circuit alternatively either said first signal receiving magnet or said second signal receiving magnet, a motor for driving said selector, and a power circuit for said motor controlled by said electrical switch.

4. In a motor control system, a selector, a telegraphically controlled magnet to control said selector, an electrical switch, wholly mechanical means controlled by said selector for operating said switch, a latch for said switch for holding said switch in operated position, a motor for driving said selector and controlled by said switch, and a further telegraphically controlled magnet to operate said latch to restore said switch.

5. In a motor control system, a selector, a telegraphically controlled magnet to control said selector, an electrical switch, wholly mechanical means controlled by said selector for operating said switch, a further telegraphically controlled magnet to control the operation of said switch, and a motor for driving said selector and controlled by said switch.

6. In combination in a motor control system, a line, a mechanical selector controllable over said line, a selectable mechanical member operable thereby, a motor control switch and a switch arm therefor, a latch member for said switch arm effective to latch said switch arm when in a predetermined position, an interponent carried by said switch arm, and a periodically operated organ adapted, when said interponent is actuated into operative relation therewith by said selectable member, to operate said switch arm to open said switch and cause it to be latched by said latch member.

7. The combination as set forth in claim 6 in which a spring maintains said switch arm latch member in its operated position and a magnet operates said latch member.

8. The combination as set forth in claim 6 together with means controllable over said line for controlling the duration of open condition of said switch.

9. In combination in a motor control system, a signal line, a first line magnet, a second line magnet, individual shunt circuits for said magnets, a motor circuit, means responsive to predetermined open-line conditions to open said motor circuit, and means operative simultaneously by said means for controlling said shunt circuits to render the system receptive to subsequent closed-line conditions to close said motor circuit.

10. In a motor control system, a line circuit, an auxiliary circuit controlled over said line circuit, a motor circuit, means responsive to predetermined open-line conditions to control the opening of said motor circuit, and means included in said auxiliary circuit responsive to closed-line conditions to close said motor circuit.

11. In a communicating system, a signaling circuit, a mechanical selector, a driving motor therefor, a selectable mechanical member operable by said selector, a motor control circuit and a switch arm therefor, an interponent carried by said switch arm, a periodically operated organ adapted, when said interponent is actuated into operative relation therewith by said member, to operate said switch arm to open said switch, and means associated with said switch arm comprising a double trip-off latch to control the starting of said motor in response to opening and then closing said signaling circuit.

12. In combination in a motor control system, a signal line, a first line magnet, a second line magnet, individual shunt circuits for said magnets, a motor control switch and a switch arm therefor, and means responsive to predetermined open-line conditions to open through said switch arm said motor control switch, said switch arm being provided with an additional switch controlling portion adapted to operate a pair of switches to selectively control said individual shunt circuits to render the system receptive to subsequent closed-line conditions to close said motor control switch.

WALTER J. ZENNER.